(12) United States Patent
Goldscheider

(10) Patent No.: US 8,292,716 B1
(45) Date of Patent: Oct. 23, 2012

(54) SYSTEM AND METHOD FOR PROVIDING A GAME OF CHANCE OVER MESSAGING SERVICES

(75) Inventor: Daniel Goldscheider, Lachen (CH)

(73) Assignee: Lottelo AG, Lachen (CH)

( * ) Notice: Subject to any disclaimer, the term of this patent is extended or adjusted under 35 U.S.C. 154(b) by 413 days.

(21) Appl. No.: 12/421,369

(22) Filed: Apr. 9, 2009

(51) Int. Cl.
- A63F 9/24 (2006.01)
- A63F 13/00 (2006.01)
- G06F 17/00 (2006.01)
- G06F 19/00 (2006.01)

(52) U.S. Cl. .................................................... 463/16

(58) Field of Classification Search ............... 463/16
See application file for complete search history.

(56) References Cited

U.S. PATENT DOCUMENTS

| | | |
|---|---|---|
| 6,688,982 B2 | 2/2004 | Moodie et al. |
| 7,035,626 B1 | 4/2006 | Luciano, Jr. |
| 7,125,336 B2 | 10/2006 | Anttila et al. |
| 2002/0160825 A1 | 10/2002 | Nicastro et al. |
| 2003/0114224 A1* | 6/2003 | Anttila et al. ............ 463/40 |
| 2005/0043089 A1 | 2/2005 | Nguyen et al. |
| 2006/0183549 A1 | 8/2006 | Chow et al. |
| 2006/0242008 A1* | 10/2006 | Harris et al. ............ 705/14 |
| 2007/0117608 A1 | 5/2007 | Roper et al. |
| 2007/0213118 A1 | 9/2007 | Karmazin |
| 2007/0249420 A1* | 10/2007 | Randall .................. 463/40 |
| 2008/0058056 A1 | 3/2008 | Johnson |
| 2008/0058057 A1 | 3/2008 | Lau et al. |
| 2008/0132314 A1 | 6/2008 | Robb et al. |
| 2009/0082081 A1 | 3/2009 | Walker et al. |
| 2009/0176549 A1 | 7/2009 | Saig et al. |
| 2009/0221358 A1 | 9/2009 | Alldredge et al. |
| 2009/0227315 A1 | 9/2009 | LaRue |
| 2010/0004045 A1 | 1/2010 | Roemer |

OTHER PUBLICATIONS

Non-Final Office Action from related U.S. Appl. No. 12/618,503, dated Nov. 22, 2011 (10 pgs).
Final Office Action from related U.S. Appl. No. 12/618,503, dated Mar. 20, 2012 (12 pgs).

* cited by examiner

Primary Examiner — William M. Brewster
(74) Attorney, Agent, or Firm — Brinks Hofer Gilson & Lione

(57) ABSTRACT

A system and method are described for providing a game of chance over messaging services. In one embodiment a method is disclosed for receiving a mobile message from a first user to participate in a game of chance. The mobile message may include an identifier of a second user. A mobile message may be sent to the second user to invite the second user to participate in the game of chance by providing an identifier of another user. A winning identifier is identified from a set of identifiers. A mobile message is sent to the first user and the second user if the amount by which the identifier of the second user matches the winning identifier satisfies a winning threshold. The mobile message may include an indication that the first user and the second user won a prize.

27 Claims, 8 Drawing Sheets

SYSTEM AND METHOD FOR PROVIDING A GAME OF CHANCE OVER MESSAGING SERVICES

BACKGROUND

The mobile phone may be increasingly important as an information and content access device. Mobile phones may be used for phone calls, messaging, such as short messaging service (SMS) messaging, multimedia messaging service (MMS) messaging, and email, and to browse the web. These features provide the users of the mobile devices access to other people and to content. Carriers may be introducing content services, multimedia services and applications, such as games, as a means of generating new revenue streams, retaining and attracting customers, increasing returns on investment, and extending and differentiating their service offerings to consumers. The emergence of these new services may be creating unique opportunities for mobile carriers and publishers to generate additional revenue streams through new and existing customers. Advancements in mobile phone technology have allowed carriers to provide graphics rich games and multimedia content to mobile phone users. However, the majority of mobile phone users may not have mobile devices capable of accessing these games and content.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
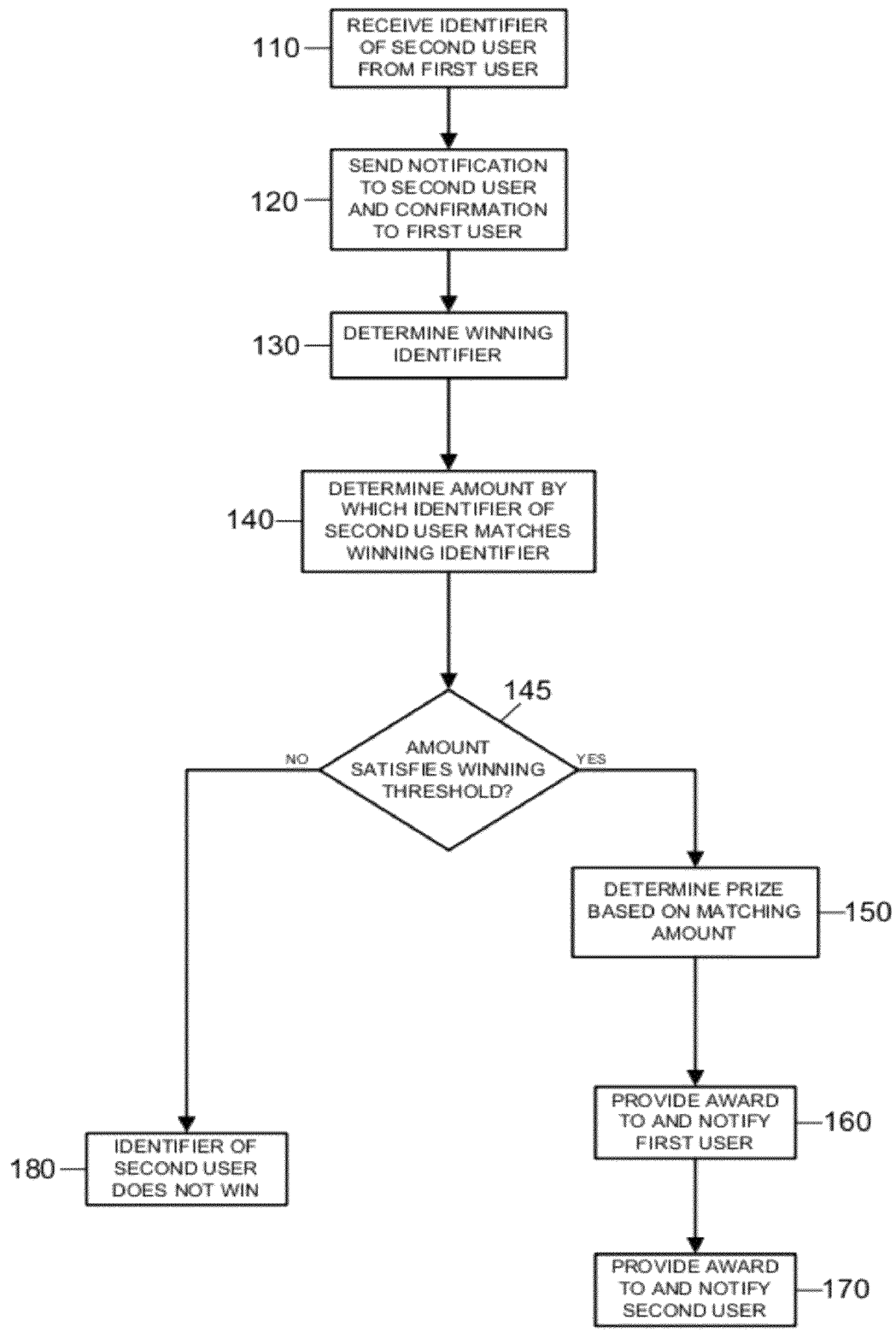
FIG. 1 is a flowchart illustrating the operations of a system for providing a game of chance over messaging services.

FIG. 1 is a flowchart illustrating the operations of a system for providing a game of chance over messaging services, such as short messaging services (SMS), multimedia messaging services (MMS), email, or generally any service capable of sending and receiving messages. At step 110, the system receives a mobile message from a first user containing an identifier of a second user. The first user may send the mobile message in order to participate in a game of chance provided by the system. For example, the system may send mobile messages to users inviting the users to participate in a game of chance by responding to the mobile message with an identifier of a second user. The identifier may be the phone number of the second user, the address of the second user, or generally any data capable of identifying the second user and/or contacting the second user. For example, the system may receive a mobile message, such as a short message service (SMS) message, also referred to as a text message, from the first user which contains the phone number of the second user. The operator of the system may charge the first user a fee for sending the SMS message to the system. Alternatively, the mobile phone operator of the user may charge the user an extra fee for sending the text message to the system. The mobile phone operator may then pay some of the fee, or the entire fee, to the operator of the system. The system may receive mobile messages containing identifiers from additional users. The steps of registering users for the game of chance are discussed in more detail in FIG. 4 below.

At step 120, the system may notify the second user that the first user entered the identifier of the second user into the game of chance. The system may also invite the second user to enter the identifier of another user into the game of chance. For example, the system may send a mobile message to the second user notifying the second user that the first user entered the identifier of the second user into the game of chance. The mobile message may also invite the second user to participate again in the game of chance by responding to the mobile message with the identifier of another user. By inviting both users to enter another identifier, the system creates a viral environment where each user whose identifier is entered into the game may then enter an identifier of another user into the game. The system may also send a message to the first user confirming that the first user is entered into the game with the identifier of the second user. The mobile message may also invite the first user to participate again in the game of chance by responding to the mobile message with the identifier of another user.

At step 130, the system may determine at least one winning identifier. If the identifier of the second user is a phone number the winning identifier may be a winning phone number. Alternatively, the system may determine multiple winning identifiers. The system may randomly select at least one winning identifier from a set of identifiers. The set of identifiers may be the identifiers received from the users. Alternatively, if the identifiers are phone numbers, the set of identifiers may be a set of active phone numbers in the geographic location where the phone number of the second user originates from. Alternatively, the set of identifiers may be a set of active phone numbers which are associated with the same country code as the phone number of the second user. Generally the set of identifiers may be any set of identifiers which includes the set of identifiers entered into the game as a subset.

At step 140, the system may determine the amount by which the identifier of the second user matches the winning identifier. If the identifiers are phone numbers the amount by which the phone numbers match may be based on the number of digits of the phone numbers that match. For example, if five digits of the phone number of the second user match the winning phone number, then the amount by which the second phone number matches the winning phone number may be five. Alternatively, the amount by which the second phone number matches the winning phone number may be the percent of the second phone number that matches the winning phone number. If the second phone number has ten digits, and five of the digits match the winning phone number, then the amount by which the phone number of the second user matches the winning phone number would be fifty percent.

At step 145, the system determines if the amount by which the second phone number matches the winning phone number satisfies the winning threshold. The winning threshold may identify the minimum amount by which the phone number of the second user must match the winning phone number in order to win the game. The operator may set the winning threshold based on the amount of prizes awarded for the game. For example, if there are a large number of prizes awarded, then the winning threshold may be set lower, which would typically result in more winners of the game. However, if there are a small number of prizes awarded, then the threshold may be set higher, which would typically result in less winners of the game. For example, if the amount by which the phone number of the second user matches the winning phone number is seven, and the winning threshold is at least six, then the amount by which the phone number of the second user matches the winning phone number would satisfy the threshold.

If, at step 145, the amount by which the identifier of the second user matches the winning identifier satisfies the threshold, the system moves to step 150. At step 150, the system determines the prize awarded to the first user and the second user based on the amount by which the identifier of the second user matches the winning identifier. For example, the prize may increase as the amount by which the identifier of the second user matches the winning identifier increases. The prizes may be arranged in tiers. For example, in the case of phone numbers, a phone number which matches all of the digits of the winning phone number would receive the largest prize, a phone number that matches all but one of the digits would receive a smaller prize, and so on. Alternatively, the system may select multiple winning identifiers. In this case, each winning identifier may be associated with a different prize amount. The system may only award the prize associated with each winning identifier if an identifier entered by a user exactly matches one of the winning identifiers.

At step 160, the system notifies the first user that the first user won a prize because the identifier of the second user, provided by the first user, matches the winning identifier. The system may also provide the prize to the first user. For example, the system may send an electronic payment in the amount of the prize determined in step 150 to the first user. At step 170, the system notifies the second user that the second user won a prize because the identifier of the second user, provided by the first user, matches the winning identifier. The system may also provide the prize to the second user. For example, the system may send an electronic payment in the amount of the prize determined in step 150 to the second user.

If, at step 145, the amount by which the identifier of the second user matches the winning identifier does not satisfy the winning threshold, the system moves to step 180. At step 180, the system determines that the identifier of the second user did not win. The system may notify the first user and the second user that the identifier of the second user did not win. The system may also invite the first user and the second user to enter another identifier into the game. For example, if the identifiers are phone numbers, the system may send a mobile message to the first user and the second user informing the users that the phone number of the second user did not win. The mobile message may also invite the first and second user to participate in another game by replying to the mobile message with a phone number.

Figure 2:
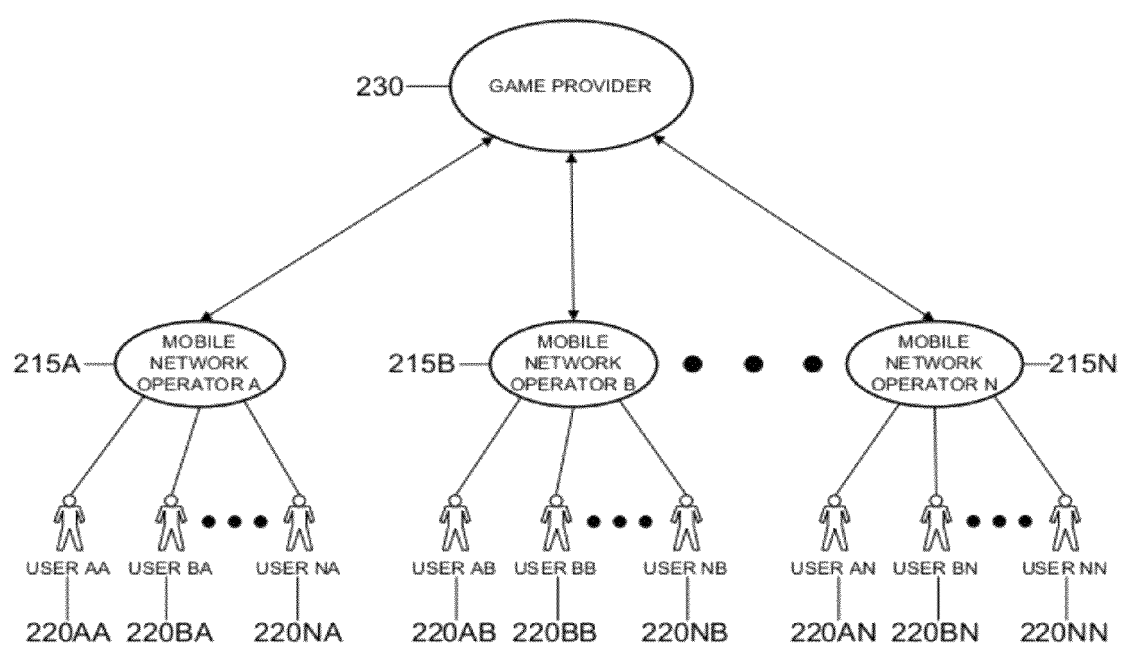
FIG. 2 is a block diagram of a general overview of a system for providing a game of chance over messaging services.

FIG. 2 provides a general overview of a system 200 for providing a game of chance over messaging services. Not all of the depicted components may be required, however, and some implementations may include additional components. Variations in the arrangement and type of the components may be made without departing from the spirit or scope of the claims as set forth herein. Additional, different or fewer components may be provided.

The system 200 may include a game provider 230, one or more mobile network operators ("MNOs") 215A-N, more commonly referred to as mobile carriers, or simply carriers, and one or more users 220AA-NN, such as mobile subscribers or consumers. The game provider 230 may provide games to the mobile users 220AA-NN, such as games of chance.

The users 220AA-NN may pay a fee to the game provider 230 to participate in the games provided by the game provider 230, such as games of chance played over mobile messaging, or generally any games capable of being provided over mobile devices. Alternatively, the user 220AA-NN may pay a fee to the MNOS 215A-N to participate in the games provided by the game provider 230, and the MNOs 215A-N may pay all or part of the fees to the game provider 230. The game provider 230 may provide the games to the mobile users 220AA-NN over the mobile web, mobile messaging, mobile applications, such as an APPLE IPHONE mobile application, an interactive voice response system, or generally any medium for communicating with users of mobile devices. In addition, the game provider 230 may maintain a web portal, which may allow the mobile users 220AA-NN to access the games provided by the game provider 230 over the interne. The game provider 230 may also allow the mobile users 220AA-NN to access the games through the postal service. For example, a mobile user 220AA-NN may send a postcard to the game provider 230 to participate in a game of chance.

The game provider 230 may maintain a mobile portal and/or a web portal where the game provider 230 may display information related to the games provided by the game provider 230. For example, the portal may display the games currently available to the users 220AA-NN, the results of previous games provided to the users 220AA-NN, entry forms for games provided by the game provider 230, rules of games provided by the game provider 230, or generally any information related to the games provided by the game provider 230. In the case of games provided to the mobile users 220AA-NN, the game provider 230 may share revenue with the MNOs 215A-N of the users 220AA-NN for providing the games to the users 220AA-NN, such as by providing the games over mobile messages sent through the mobile infrastructure of the MNOs 215A-N. The revenue may be collected from the users 220AA-NN by the game provider and/or the revenue may be collected from the users 220AA-NN by the MNOs 215A-N.

The MNOs 215A-N may provide a mobile network to the users 220AA-NN which may provide a variety of services to the users 220AA-NN, such as the ability to send and receive phone calls, send and receive mobile messages, to access the interne and/or the mobile web, or generally any service that may be implemented on a mobile device. The MNOs 215A-N may store data describing the users 220AA-NN, such as billing addresses, call histories, messaging histories, or generally any data regarding the users 220AA-NN that may be available to the MNOs 215A-N.

The game provider 230 may provide an application programming interface ("API") to the MNOs 215A-N to allow the MNOs 215A-N to access the mobile services of the game provider 230, such as mobile games. The MNOs 215A-N may provide the mobile games of the game provider 230 to the users 220AA-NN. The mobile games may be provided transparently to the mobile users 220AA-NN such that the users 220AA-NN are unaware that the mobile games originated from the game provider 230.

The users 220AA-NN may be mobile users who may engage in messaging with one another, such as through a short message service ("SMS"), a multimedia messaging service ("MMS"), enhanced messaging service ("EMS"), J-PHONE's Skymail, NTT DOCOMO'S Short Mail, or generally any service for sending messages to/from mobile devices. The mobile messages may be routed through the MNOs 215A-N. The users 220AA-NN may wish to participate in games over the mobile messaging services. For example, the mobile devices of the users 220AA-NN may be technologically limited such that the devices are not capable of playing graphically intensive games, or games which require high bandwidth. Thus, the users 220AA-NN may only be able to participate in games provided over mobile messaging services or other low-bandwidth services.

The users 220AA-NN may interact individually with the game provider 230, through the mobile network operators 215A-N, such as via a mobile phone or any mobile device capable of communicating with the mobile network operators 215A-N. The users 220AA-NN may interact with the game provider 230 via a mobile web based application, a mobile standalone application, a mobile messaging application, or any application capable of running on a mobile device. The game provider 230 may communicate mobile messages to the users 220AA-NN over the mobile infrastructure provided by the MNOs 215A-N.

The game provider 230 may send mobile messages to the users 220AA-NN notifying the users 220AA-NN of currently available games. For example, the game provider 230 may notify the users 220AA-NN of an open registration for a game of chance over mobile messaging. The users 220AA-NN may respond to the mobile message with the identifier of another user to participate in the game of chance. In one example, a first user 220AA may respond with a mobile message containing an identifier of a second user 220BB, such as the mobile phone number of the second user 220BB. The game provider 230 may send a mobile message to the second user 220BB informing the second user 220BB that they have been registered for the game of chance. The message may notify the second user 220BB that they may participate in the game of chance by responding to the mobile message. If the mobile number of the second user 220BB wins the game of chance, both the first user 220AA and the second user 220BB are rewarded with a prize.

Figure 3:
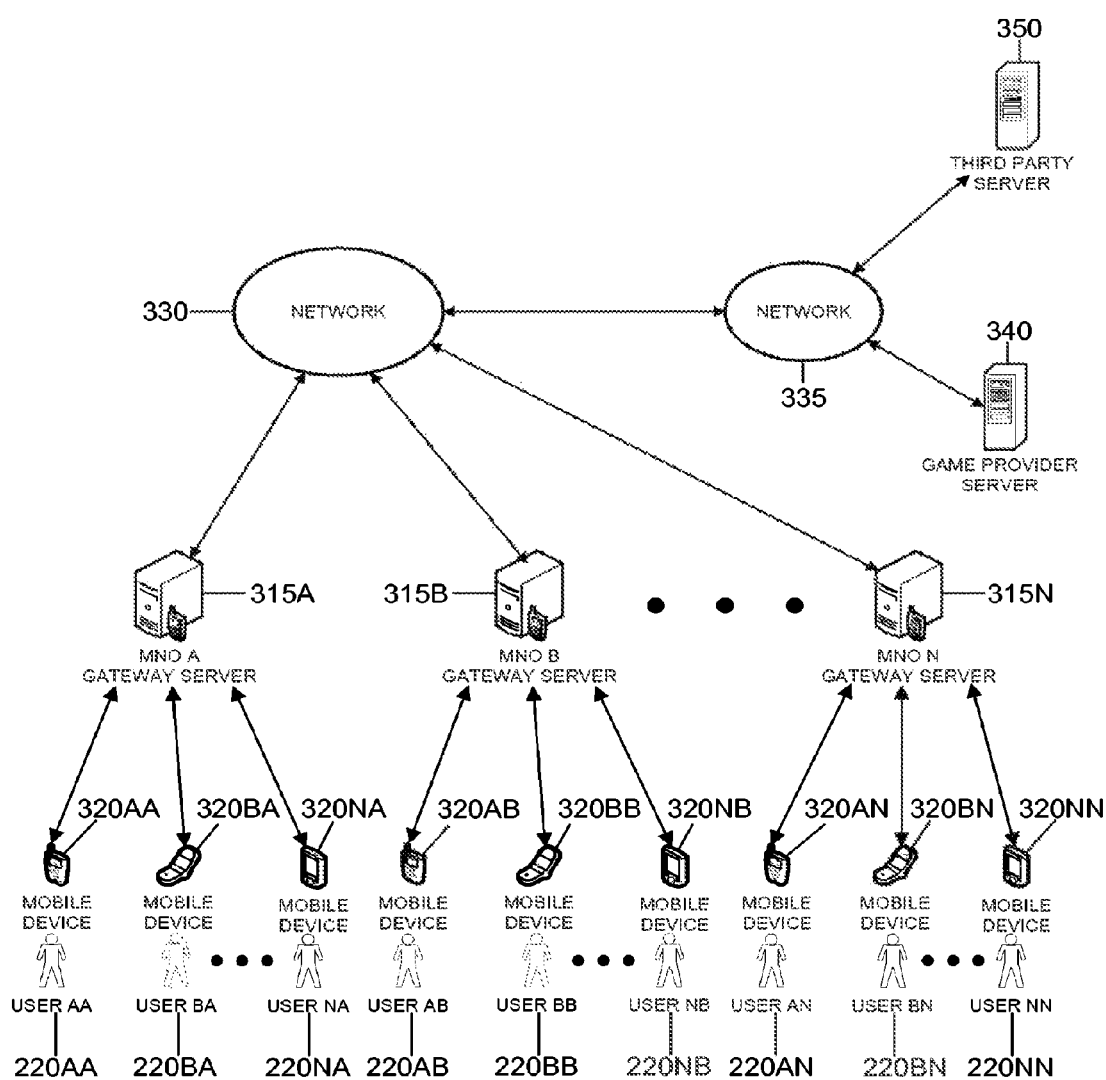
FIG. 3 is block diagram of a simplified view of a network environment implementing the system of FIG. 2 or other systems for providing game of chance over mobile messaging.

FIG. 3 provides a simplified view of a network environment implementing a system 300 for providing a game of chance over messaging services. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 300 may include one or more mobile applications, such as mobile messaging applications and/or mobile browsers, which may be running on one or more mobile devices 320AA-NN. The system 300 may also include one or more MNO gateway servers 315A-N, a network 330, a network 335, the game provider server 340, and a third party server 350.

Some or all of the game provider server 340 and third party server 350 may be in communication with each other by way of network 335 and may be the system or components described below in FIG. 8. The game provider server 340 and third-party server 350 may each represent multiple linked computing devices. Multiple distinct third party servers, such as the third-party server 350, may be included in the system 300. The third-party server 350 may be an MNO gateway server 315A-N or a server associated with, or in communication with an MNO gateway server 315A-N. Alternatively, the third party server 350 may be a data source capable of providing all of the active phone numbers in a given geographic region, such as a country.

The networks 330, 335 may include wide area networks ("WAN"), such as the interne, mobile networks, local area networks ("LAN"), campus area networks, metropolitan area networks, or any other networks that may allow for data communication. The network 330 may include the Internet and may include all or part of network 335; network 335 may include all or part of network 330. The networks 330, 335 may be divided into sub-networks. The sub-networks may allow access to all of the other components connected to the networks 330, 335 in the system 300, or the sub-networks may restrict access between the components connected to the networks 330, 335. The network 335 may be regarded as a public or private network connection and may include, for example, a virtual private network or an encryption or other security mechanism employed over the public Internet, or the like.

The users 220AA-NN may use a mobile application running on a mobile device 320AA-NN, such as a mobile web browser, to communicate with the game provider server 340, via the MNO gateway servers 315A-N and the networks 330, 335. The game provider server 340 may communicate to the users 320AA-NN via the networks 330, 335 and the MNO gateway servers 315A-N, through the mobile devices 320AA-NN.

The web applications, standalone applications, mobile applications and mobile devices 320AA-NN may be connected to the network 330 in any configuration that supports data transfer. This may include a data connection to the network 330 that may be wired or wireless. The mobile devices 320AA-NN may be one of a broad range of electronic devices which may include mobile phones, PDAs, and laptops and notebook computers. The mobile devices 320AA-NN may have a reduced feature set, such as a smaller keyboard and/or screen, however the mobile devices 320AA-NN may be capable of supporting mobile messaging.

The data connection of the mobile devices 320AA-NN may be a cellular connection, such as a GSM/GPRS/WCDMA connection, a wireless data connection, an internet connection, an infra-red connection, a Bluetooth connection, or any other connection capable of transmitting data. The data connection may be used to connect directly to the network 330, or to connect to the network 330 through the MNO gateway servers 315A-N.

The MNOs 215A-N may utilize various components to provide these services to the users 220AA-NN, such as network switching systems ("NSS"), mobile switching centers ("MSC"), mobile switching center servers ("MSC-S"), home location registers ("HLR"), authentication centers ("AUC"), short message service centers ("SMSC"), signal transfer points ("STP"), message service centers ("MSC"), or generally any component that may be utilized to provide the mobile services. The MNOs 215A-N may interface with one or more external short messaging entities ("ESME"), such as the third party server 350, which may connect to the MNOs 215A-N to send and/or receive mobile messages to the users 220AA-NN. The ESMEs may provide voicemail, web, email, or other services to the users 220AA-NN of the MNOs 215 A-N.

The game provider server 340 may include one or more of the following: an application server, a data source, such as a database server, a middleware server, and an advertising services server. The game provider server 340 may co-exist on one machine or may be running in a distributed configuration on one or more machines. The game provider server 340 may collectively be referred to as the server. The game provider server 340 may receive mobile messages from the users 220AA-NN and may send mobile messages to the users 220AA-NN.

The third party server 350 may include one or more of the following: an application server, a data source, such as a database server, a middleware server, and an advertising services server. The third party server 350 may co-exist on one machine or may be running in a distributed configuration on one or more machines. Alternatively or in addition, the third party server may be an ESME server.

Figure 8:
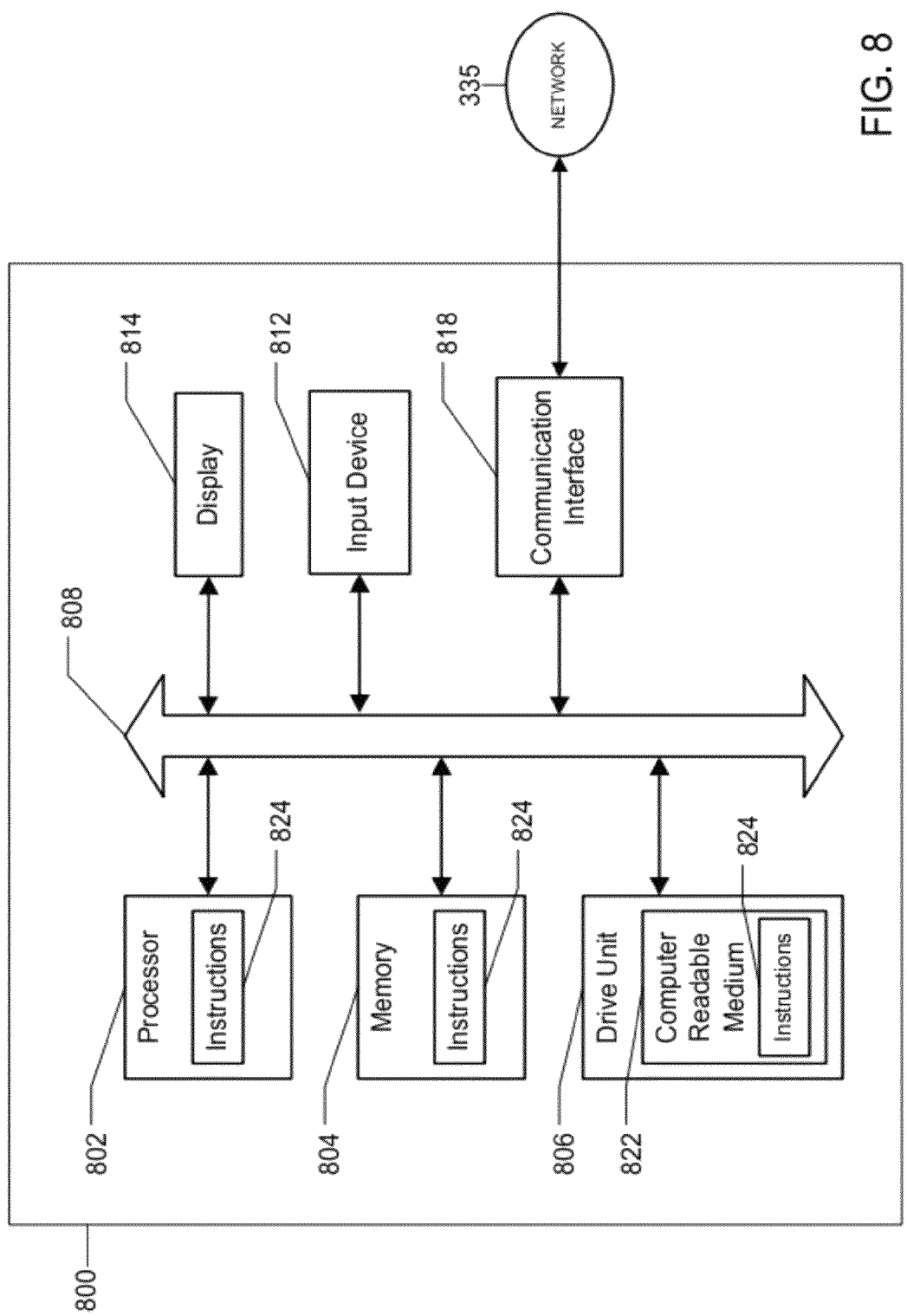
FIG. 8 is an illustration a general computer system used in the system of FIG. 2, or other systems for providing a game of chance over messaging services.

The game provider server 340, the third party server 350, the MNO gateway servers 315A-N, and the mobile devices 320AA-NN may be one or more computing devices of various kinds, such as the computing device in FIG. 8. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to mobile messaging protocols.

Figure 4:
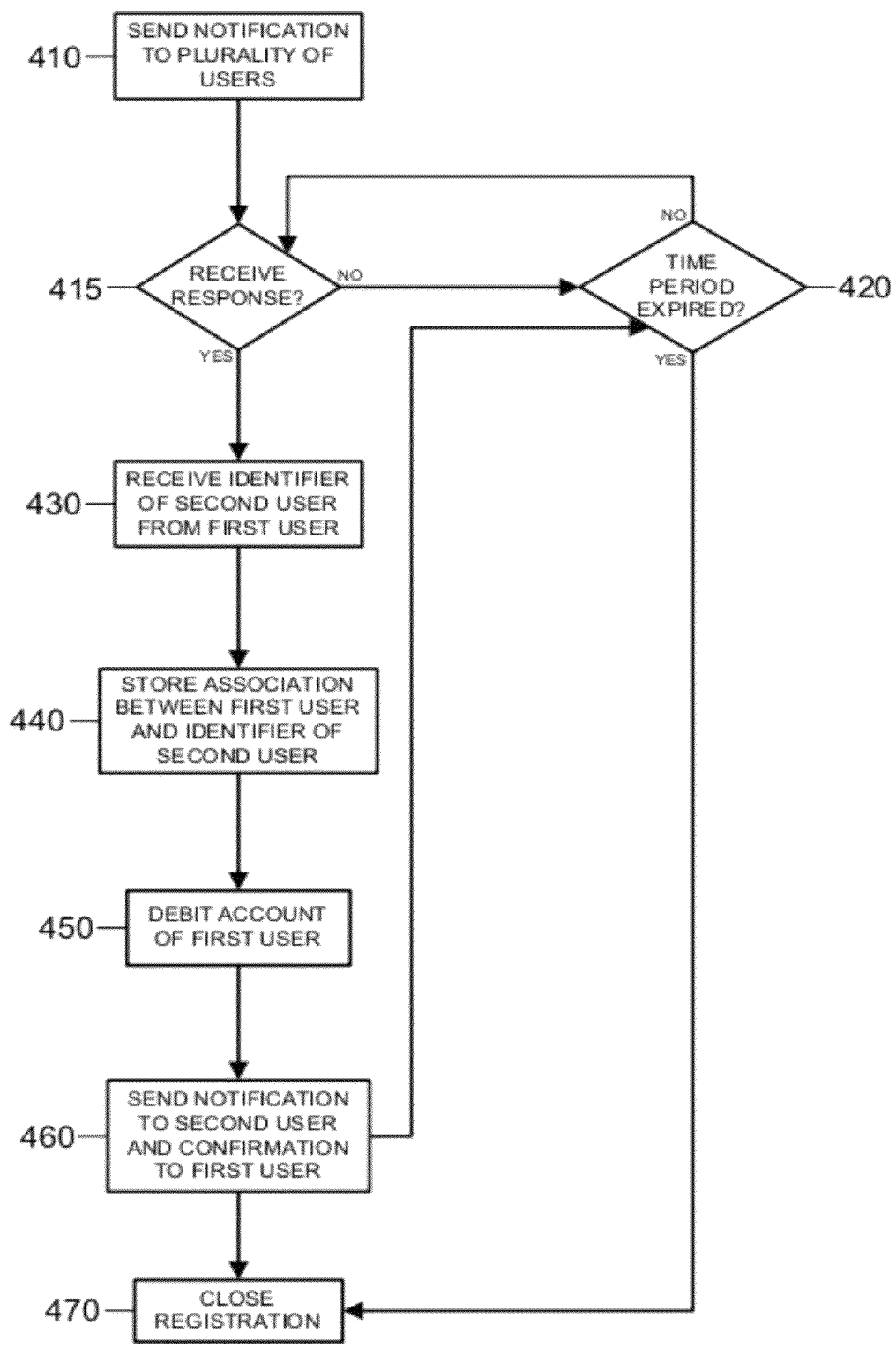
FIG. 4 is a flowchart illustrating a registration operation of the system of FIG. 2 or other systems for providing a game of chance over messaging services.

FIG. 4 is a flowchart illustrating a registration operation of the system of FIG. 2, or other systems for providing a game of chance over messaging services. At step 410, the system 200 sends a notification to the users 220AA-NN inviting the users to register for a game of chance by providing an identifier of another user. The notification may be a mobile message sent to the users 220AA-NN through the MNOs 215A-N. The notification may also include the amount of time left for the users 220AA-NN to register for the game. For example, a registration period for a game may only last for a period of time, such as a day. After the period of time expires, the users 220AA-NN may no longer be allowed to participate in that particular game. However, the user may be automatically entered into the next game.

At step 415, the system 200 waits for one of the users 220AA-NN to respond to the notification of the game. If, at step 415, the system 200 does not receive a response, the system 200 moves to step 420. At step 420, the system 200 checks to determine if the registration period has closed. If, at step 420, the system 200 determines that the registration period has not closed, the system 200 returns to step 415 and waits for a response from one of the users 220AA-NN.

If, at step 415, the system 200 receives a response from one of the users 220AA-NN, the system 200 moves to step 430. At step 430, the system 200 receives an identifier of a second user from a first user in order for the first user to register for the game of chance. For example, a first user may send a mobile message to the system 200 which contains an identifier of the second user, such as a phone number of the second user. At step 440, the system 200 stores an association between the first user and the identifier of the second user in a data store or in a memory. The system 200 may use the association to determine which user provided the identifier of the second user. At step 450, the system 200 may debit an account of the first user. The account of the first user may be debited by the game provider server 340, or may be debited by one of the MNOs 215A-N. For example, the MNO which provided mobile service to the first user may charge the mobile account of the first user an extra fee for sending the mobile message to the system 200.

At step 460, the system 200 may send a mobile message to the second user notifying the second user that the first user entered the identifier of the second user into the game of chance. The mobile message may also invite the second user to participate in the game of chance by responding to the mobile message with the identifier of another user. However, regardless of whether the second user provides an identifier of another user, the second user is entered in the game of chance once the first user entered the identifier of the second user. The system 200 may also send a mobile message to the first user confirming that the first user entered the identifier of the second user into the game of chance. The mobile message may also invite the first user to participate again in the game of chance by responding to the mobile message with the identifier of another user.

After sending the mobile message notification to the second user, the system 200 returns to step 420 and determines whether the registration time period has expired. Once the registration time period expires, the system 200 moves to step 470. At step 470, the registration for the game of chance is closed. Alternatively, when the registration for the game of chance closes, a registration for another game of chance may immediately open. Thus, if a user enters an identifier into the game of chance after the registration time period expires, the user may be automatically entered into the next game of chance.

Figure 5:
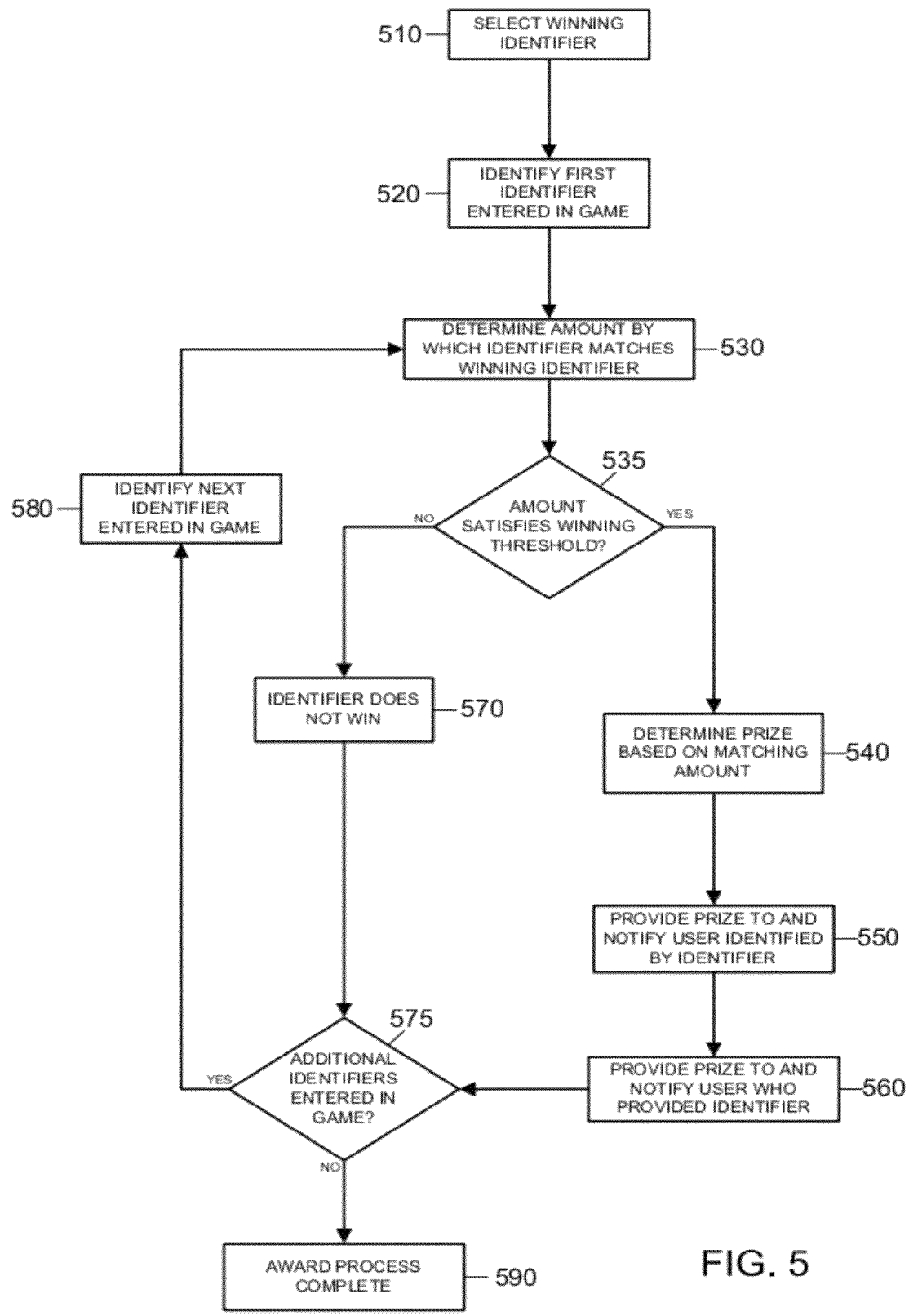
FIG. 5 is a flowchart illustrating a game-play operation of the system of FIG. 2 or other systems for providing a game of chance over messaging services.

FIG. 5 is a flowchart illustrating a game-play operation of the system of FIG. 2 or other systems for providing a game of chance over messaging services. At step 510, the system 200 selects a winning identifier from a set of identifiers. As previously mentioned, the set of identifiers may be the set of identifiers entered into the game of chance, a set of identifiers which exist in a geographic region, or generally any set of identifiers of which includes a subset containing the identifiers entered into the game of chance.

At step 520, the system 200 retrieves the first identifier entered into the game of chance. For example, the system 200 may retrieve the first identifier stored in a database or from memory. At step 530, the system determines the amount by which the identifier matches the winning identifier. The amount may be a percentage of the identifier which matches the winning identifier, or a number of characters and/or numbers of the identifier which match the winning identifier. One game of chance may require that the characters and/or numbers of the identifier match the winning identifier in order. However, other games may not require that the characters and/or numbers of the identifier match the winning identifier in order.

At step 535, the system 200 determines whether the determined amount by which the identifier matches the winning identifier satisfies the winning threshold. The winning threshold may be different for each game depending upon the amount of winners the operator would like each game to have. The lower the winning threshold is, the more winners there will likely be and vice-versa. Thus, the winning threshold may vary depending upon the number of identifiers entered into the game, the fee for entering the game, and the size of the prizes awarded for each amount by which each identifier matches the winning identifier. If, at step 535, the system 200 determines that the amount by which the identifier matches the winning identifier satisfies the winning threshold, the system 200 moves to step 540.

At step 540, the system 200 determines the prize for the identifier based on the amount by which the identifier matches the winning identifier. For example, the prize may increase as the amount by which the identifier of the second user matches the winning identifier increases. The prizes may be arranged in tiers. For example, in the case of phone numbers, a phone number which matches all of the digits of the winning phone number would receive the largest prize, a phone number that matches all but one of the digits would receive a smaller prize, etc.

At step 550, the system 200 may notify the user identified by the identifier that the user won a prize because the identifier of the user matches the winning identifier. For example, the system 200 may sent a mobile message to the user informing the user that they won a prize and inviting the user to participate in another game by responding to the mobile message with an identifier of a user. The system 200 may also provide the prize to the user identified by the identifier. For example, the system 200 may send an electronic payment in the amount of the prize determined in step 540 to the user identified by the identifier. At step 560, the system 200 notifies the user who entered the identifier into the game that the user won a prize because the identifier entered by the user matches the winning identifier. For example, the system 200 may send a mobile message to the user informing the user that they won a prize and inviting the user to participate in another game by responding to the mobile message with an identifier of a user. The system 200 may also provide the prize to the user who entered the identifier. For example, the system 200 may send an electronic payment in the amount of the prize determined in step 540 to the user who provided the identifier.

If, at step 535, the system 200 determines that the amount by which the identifier matches the winning identifier does not satisfy the winning threshold, then the system 200 moves to step 570. At step 570, the system determines that the identifier does not win, and thus, the user who provided the identifier, and the user who is identified by the identifier, do not win a prize for the entry. The system 200 may send a mobile message to the users to inform them that they did not win and invite them to play in the next game of chance by responding to the mobile message with an identifier of a user. At step 575, the system 200 determines whether there are additional identifiers which were entered into the game. If, at step 575, the system 200 determines that there are additional identifiers entered into the game, then the system 200 moves to step 580. At step 580, the system 200 identifies the next identifier entered into the game and repeats steps 530-575 for the next identifier.

If, at step 575, the system 200 determines that there are no additional identifiers entered into the game, then the system 200 moves to step 590. At step 590, the award process is complete and the system 200 may send out mobile messages to the users 220AA-NN informing the users 220AA-NN of the next game of chance.

Figure 6:
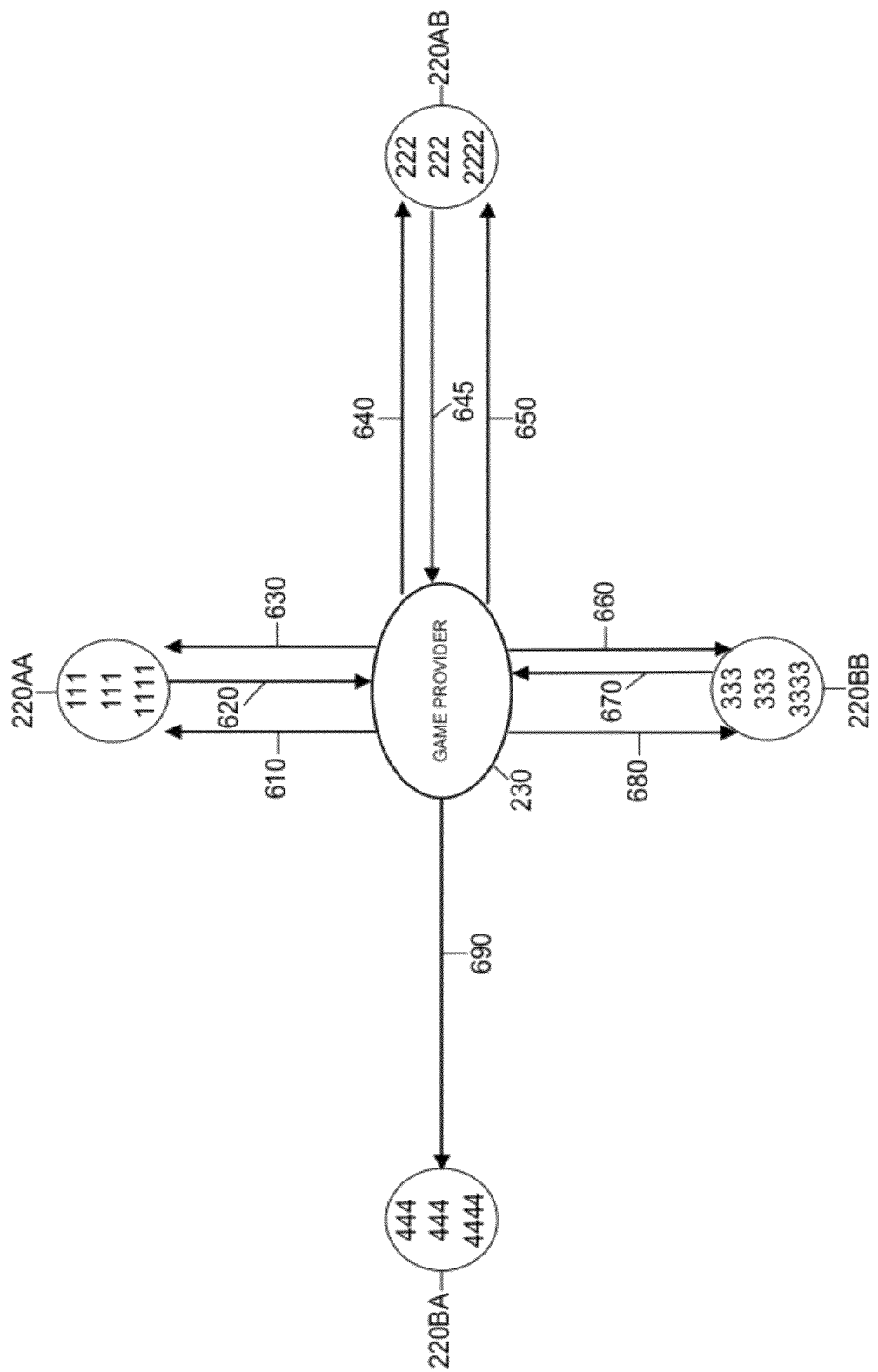
FIG. 6 is an illustration demonstrating a user case in the system of FIG. 2 or other systems for providing a game of chance over messaging services.

FIG. 6 is a diagram demonstrating an exemplary use case of the system of FIG. 2 or other systems for providing a game of chance over messaging services. In FIG. 6, the user 220AA has the phone number "111-111-1111," the user 220AB has the phone number "222-222-2222," the user 220BB has the phone number "333-333-3333," and the user 220BA has the phone number "444-444-4444." At step 610, the game provider 230 sends a mobile message to the mobile device 320AA of the mobile user 220AA. The mobile message informs the user 220AA that registration is open for a game of chance and invites the user 220AA to participate in the game of chance by providing a mobile phone number of another user. At step 620, the user 220AA sends a mobile message to the game provider 230 to participate in the game of chance. The mobile message includes the phone number "222-222-2222" of the user 220AB. At step 630, the game provider 230 sends a mobile message to the user 220AA confirming that the user 220AA is entered into the game of chance with the phone number "222-222-2222." The mobile message may also invite the user 220AA to participate in the game of chance again by replying to the mobile message with a phone number.

At step 640, the game provider 230 sends a mobile message to the user 220AB to inform the user 220AB that the phone number of the user 220AB was entered into the game of chance by the user 220AA. The mobile message may also invite the user 220AB to participate in the game of chance by replying to the mobile message with a phone number. At step 645, the user 220AB replies to the mobile message of the game provider 230 with the phone number "333-333-3333" of the user 220BB. At step 650, the game provider 230 sends a mobile message to the user 220AB confirming that the user 220AB is entered into the game of chance with the phone number "333-333-3333." The mobile message may also invite the user 220AB to participate again in the game of chance by replying to the mobile message with a phone number.

At step 660, the game provider 230 sends a mobile message to the user 220BB to inform the user 220BB that the phone number of the user 220BB was entered into the game of chance by the user 220AB. The mobile message may also invite the user 220BB to participate in the game of chance by replying to the mobile message with a phone number. At step 670, the user 220BB replies to the mobile message from the game provider 230 with the phone number "444-444-4444" of the user 220BA. At step 680, the game provider 230 sends a mobile message to the user 220BB confirming that the user 220BB is entered into the game of chance with the phone number "333-333-3333." The mobile message may also invite the user 220AA to participate in the game of chance again by replying to the mobile message with a phone number.

At step 690, the game provider 230 sends a mobile message to the user 220BA to inform the user 220BA that the phone number of the user 220BA was entered into the game of chance by the user 220BB. The mobile message may also invite the user 220BA to participate in the game of chance by replying to the mobile message with a phone number. The steps of the use case may demonstrate how the game of chance can rapidly proliferate from user to user.

Figure 7:
FIG. 7 is a screenshot of an web page related to a game provided by the system of FIG. 2 or other systems for providing a game of chance over mobile devices.

FIG. 7 is a screenshot of a web page 700 related to a game provided by the system of FIG. 2 or other systems for providing a game of chance over messaging services. The web page 700 may include the phone number used to participate in the game, such as by sending a mobile message to the phone number. The web page 700 may also include the winning phone number for a particular date, such as 2010.01.01. The web page 700 may also include the amount of the prize won by both the user who submits the phone number and the user who the phone number belongs to. The web page 700 demonstrates that the prize may vary depending upon the amount of the submitted phone number which matches the winning phone number.

FIG. 8 illustrates a general computer system 800, which may represent the game server 340, the third party server 350, the mobile devices 320AA-NN, the MNO gateway servers 315A-N or any of the other computing devices referenced herein. The computer system 800 may include a set of instructions 824 that may be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 824 (sequential or otherwise) that specify actions to be taken by that machine. In a particular embodiment, the computer system 800 may be implemented using electronic devices that provide voice, video or data communication. Further, while a single computer system 800 may be illustrated, the term "system" shall also be taken to include any collection of systems or subsystems that individually or jointly execute a set, or multiple sets, of instructions to perform one or more computer functions.

As illustrated in FIG. 8, the computer system 800 may include a processor 802, such as, a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 804 may include a cache or random access memory for the processor 802. Alternatively, the memory 804 may be separate from the processor 802, such as a cache memory of a processor, the system memory, or other memory. The memory 804 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 804 may be operable to store instructions 824 executable by the processor 802. The functions, acts or tasks illustrated in the figures or described herein may be performed by the programmed processor 802 executing the instructions 824 stored in the memory 804. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 800 may further include a display 814, such as a liquid crystal display (LCD), an organic light emitting diode (OLED), a flat panel display, a solid state display, a cathode ray tube (CRT), a projector, a printer or other now known or later developed display device for outputting determined information. The display 814 may act as an interface for the user to see the functioning of the processor 802, or specifically as an interface with the software stored in the memory 804 or in the drive unit 806.

Additionally, the computer system 800 may include an input device 812 configured to allow a user to interact with any of the components of system 800. The input device 812 may be a number pad, a keyboard, or a cursor control device, such as a mouse, or a joystick, touch screen display, remote control or any other device operative to interact with the system 800.

The computer system 800 may also include a disk or optical drive unit 806. The disk drive unit 806 may include a computer-readable medium 822 in which one or more sets of instructions 824, e.g. software, can be embedded. Further, the instructions 824 may perform one or more of the methods or logic as described herein. The instructions 824 may reside completely, or at least partially, within the memory 804 and/or within the processor 802 during execution by the computer system 800. The memory 804 and the processor 802 also may include computer-readable media as discussed above.

The present disclosure contemplates a computer-readable medium 822 that includes instructions 824 or receives and executes instructions 824 responsive to a propagated signal; so that a device connected to a network 335 may communicate voice, video, audio, images or any other data over the network 335. Further, the instructions 824 may be transmitted or received over the network 335 via a communication interface 818. The communication interface 818 may be a part of the processor 802 or may be a separate component. The communication interface 818 may be created in software or may be a physical connection in hardware. The communication interface 818 may be configured to connect with a network 335, external media, the display 814, or any other components in system 800, or combinations thereof. The connection with the network 335 may be a physical connection, such as a wired Ethernet connection or may be established wirelessly as discussed below. Likewise, the additional connections with other components of the system 800 may be physical connections or may be established wirelessly.

The network 335 may include wired networks, wireless networks, or combinations thereof. The wireless network may be a cellular telephone network, an 802.11, 802.16, 802.20, or WiMax network. Further, the network 335 may be a public network, such as the Internet, a private network, such as an intranet, or combinations thereof, and may utilize a variety of networking protocols now available or later developed including, but not limited to TCP/IP based networking protocols.

The computer-readable medium 822 may be a single medium, or the computer-readable medium 822 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 822 may include a solid-state memory such as a memory card or other package that houses one or more non-volatile read-only memories. The computer-readable medium 822 also may be a random access memory or other volatile re-writable memory. Additionally, the computer-readable medium 822 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A computer implemented method for providing a game of chance over messaging services, the method comprising:
   receiving, by a processor, a first mobile message comprising of an identifier of a second user, wherein the first mobile message is provided by a first user to register in the game of chance;
   sending, by the processor, a second mobile message to the second user, wherein the second mobile message notifies the second user that the first user entered the second user into the game of chance and invites the second user to provide an identifier of another user;
   determining, by the processor, a winning identifier from a plurality of identifiers; and
   sending, by the processor, a winning mobile message to the first user and the second user if an amount by which the identifier of the second user matches the winning identifier satisfies a winning threshold, wherein the winning mobile message comprises of an indication that the first user and the second user won a prize.

2. The method of claim 1 further comprising sending a notification mobile message to the first user, wherein the notification email message notifies the first user of the game of chance.

3. The method of claim 1 wherein the identifier of the second user comprises of a phone number of the second user and the winning identifier comprises of a winning phone number.

4. The method of claim 3 wherein the amount satisfies the winning threshold if the phone number of the second user matches a determined number of digits of the winning phone number.

5. The method of claim 3 wherein determining, by the processor, the winning phone number from the plurality of identifiers further comprises, selecting, by the processor, the winning phone number from a plurality of active phone numbers which share a country code with the phone number of the second user.

6. The method of claim 3 wherein determining, by the processor, the winning identifier further comprises, selecting, by the processor, the winning phone number from a plurality of active phone numbers in a geographic region where the phone number of the second user originates from.

7. The method of claim 6 wherein the winning phone number is randomly selected from the plurality of active phone numbers.

8. The method of claim 1 wherein an amount of the prize is determined based on the amount by which the identifier of the second user matches the winning identifier.

9. The method of claim 8 wherein the amount of the prize increases as the amount by which the identifier of the second user matches the winning identifier increases.

10. The method of claim 1 wherein the prize comprises of a monetary amount.

11. The method of claim 10 further comprising sending, by the processor, an electronic payment of the monetary amount to the first user and to the second user if the amount by which the identifier of the second user matches the winning identifier satisfies the winning threshold.

12. The method of claim 1 wherein the amount by which the identifier of the second user matches the winning identifier satisfies the winning threshold if the identifier of the second user exactly matches the winning identifier.

13. A computer implemented method for providing a game of chance over messaging services, the method comprising:
receiving, by a processor, a first mobile message comprising of an identifier of a second user, wherein the first mobile message is sent from a first mobile device of a first user to register in the game of chance; storing, by the processor in a memory, the identifier of the second user and an association between the first user and the identifier of the second user;
determining, by the processor, a winning identifier from a plurality of identifiers;
sending, by the processor, a winning mobile message to the first mobile device of the first user and a second mobile device of the second user if an amount by which the identifier of the second user matches the winning identifier satisfies a winning threshold, wherein the winning mobile message comprises of an indication that the first user and the second user won a prize.

14. A computer implemented method for providing a game of chance over messaging services, the method comprising:
sending, by a processor, a notification mobile message to a plurality of mobile devices of a plurality of users, wherein the notification mobile message invites the plurality of users to register in the game of chance;
receiving, by a processor, a plurality of mobile messages from the plurality of mobile devices of the plurality of users, each mobile message comprising of an identifier of a different user than the user who sent each mobile message;
determining, by the processor, a winning identifier from a plurality of identifiers;
identifying a plurality of matching identifiers, wherein each matching identifier comprises of an identifier which matches at least an amount of the winning identifier; and
sending, by the processor, a winning mobile message to each user identified by each matching identifier and to each user who sent the mobile message comprising of each matching identifier, wherein the winning mobile message comprises of an indication that each user identified by each matching identifier and each user who sent the mobile message comprising of each matching identifier won a prize.

15. The method of claim 14 wherein each mobile message comprises of a phone number of the different user than the user who sent each mobile message and the winning identifier comprises of a winning phone number.

16. The method of claim 13 wherein identifying the plurality of matching identifiers, wherein each matching identifier comprises of the identifier which matches at least the amount of the winning identifier further comprises identifying the plurality of matching identifiers, wherein each matching identifier matches a determined number of digits of the winning phone number.

17. The method of claim 16 wherein an amount of the prize won by each matching identifier is determined based on the amount by which each matching identifier matches the winning identifier.

18. The method of claim 17 wherein the amount of the prize won by each matching identifier increases as the amount by which each matching identifier of the second user matches the winning identifier increases.

19. The method of claim 14 further comprising, sending, by the processor, a second mobile message to each different user identified in each mobile message, wherein the second mobile message comprises of a notification indicating that each different user was entered into the game of chance by the user who sent the mobile message comprising of the identifier of the different user.

20. The method of claim 19 wherein the second mobile message further comprises an invitation to the different user to enter another identifier into the game of chance.

21. A computer readable medium, the computer readable medium comprising instructions for:
receiving a first mobile message comprising of an identifier of a second user, wherein the first mobile message is provided by a first user to register in a game of chance;
sending a second mobile message to the second user, wherein the second mobile message notifies the second user that the first user entered the second user into the game of chance and invites the second user to provide an identifier of another user;
determining a winning identifier from a plurality of identifiers;
sending a winning mobile message to the first user and the second user if an amount by which the identifier of the second user matches the winning identifier satisfies a winning threshold, wherein the winning mobile message comprises of an indication that the first user and the second user won a prize.

22. The computer readable medium of claim 21 further comprising instructions for sending a notification mobile message to the first user, wherein the notification email message notifies the first user of a game of chance.

23. The computer readable medium of claim 21 wherein the identifier of the second user comprises of a phone number of the second user and the winning identifier comprises of a winning phone number.

24. The computer readable medium of claim 21 wherein the amount by which the identifier of the second user matches the winning identifier satisfies the winning threshold if the phone number of the second user matches a number of digits of the winning number.

25. The computer readable medium of claim 21 wherein an amount of the prize is determined based on the amount by which the identifier of the second user matches the winning identifier.

26. The computer readable medium of claim 25 wherein the amount of the prize increases as the amount by which the identifier of the second user matches the winning identifier increases.

27. The computer readable medium of claim 21 wherein the processor is further operative to communicate with the second user using the identifier of the second user.

* * * * *